Patented Oct. 15, 1940

2,217,735

UNITED STATES PATENT OFFICE 2,217,735

MANUFACTURE OF ESTERS

Henry Dreyfus, London, England

No Drawing. Application November 10, 1937, Serial No. 173,868. In Great Britain November 14, 1936

8 Claims. (Cl. 260—497)

This invention relates to the manufacture of esters.

According to the invention esters are manufactured by causing an olefine to react with an organic acid in the presence of a compound of phosphorus.

For example, when it is desired to make ethyl acetate, for the manufacture of which the new process is particularly valuable, ethylene is caused to react with acetic acid in the presence of a phosphorus compound. Other esters may readily be prepared by varying either the olefine or the acid or both. For example propyl acetate may be made from propylene and acetic acid, and higher olefines, e. g., butylenes or amylenes, may be employed to make esters of the corresponding alcohols; moreover other acids, for example propionic acid, butyric acid or higher fatty acids or other organic acids may provide the acid component of the ester to be made. Mixed esters may be prepared, for example, by causing a mixture of two olefines to react with a di-basic acid, e. g., succinic acid.

The phosphorus compounds which are employed as catalysts may either be acid compounds of phosphorus or compounds derived therefrom. or basic compounds of phosphorus or compounds derived therefrom. Examples of acidic compounds and their derivatives are phosphoric acid and salts thereof, for example sodium phosphate, potassium phosphate, ammonium phosphate and phosphates of organic bases such as the simple alkylamines. Mixtures of such compounds may be employed; for example, when it is desired to employ a molten catalyst an equimolecular mixture of sodium and lithium phosphates is very useful. Esters of phosphoric acid may be used, especially neutral esters, e. g., tri-methyl phosphate and tri-ethyl phosphate. Again amides of phosphoric acid may be used. Examples of these compounds are phosphoric acid mono-amide mono-diethylamide or -anilide; phosphoric acid mono-ethyl ester mono-amide mono-anilide; phosphoric acid mono-ethyl ester bis-diethyl-amide, bis-anilide or bis-piperidide; phosphoric acid mono-ethyl ester diethylamide piperidide, mono-ethyl ester mono-anilide, mono-phenyl ester mono- or bis-anilide, mono-4-chlorpenyl ester bis-anilide, diethyl ester diethylamide, diethyl ester methylanilide, diethyl ester 4-chloranilide or p-toluidide, diphenyl ester methyl anilide; phosphoric acid bis-4-chloranilide or bis-p-phenetidide; phosphoric acid tris-propylamide, tris-isobutylamide, tris-diethylamide, tris-anilide, tris-p-toluidide, tris-p-phenetidide, tris-as-o-xy- lidide, tris-benzylamide, tris-p-chloranilide, tris-monomethylanilide, tris-piperidide, or mixed derivatives such as the diethylamide-bis-anilide, di-isopropylamide-bis-p-toluidide, piperidide-bis-p-toluidide, bis-piperidide-anilide and the like. Amides of phosphorous acid may be used as catalysts. Examples of such amides are phosphorus acid mono-ethyl ester bis-diethylamide, bis-dispropylamide, and bis-piperidide and phosphorus acid tris-diethylamide, tris-di-isopropylamide, tris-piperidide, and di-isobutylamide-bis-piperidide. Acid phosphorus compounds, for instance phosphoric acid and its esters or ammonium phosphate, may be used in association with volatile bases, for example ammonia or pyridine. Volatile bases may also be present when the phosphorus-containing catalyst is present only in the liquid and/or solid phase.

Basic compounds of phosphorus that may be employed include for example phosphine and substituted phosphines, tetraphosphonium bases and their salts and triphopshine oxides. These three classes have the general formulae

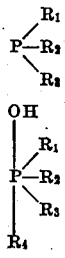

or salts thereof, and

where $R_1$, $R_2$, $R_3$ and $R_4$ represent hydrogen or organic radicles, for example aliphatic, aromatic or hydro-aromatic radicles. The triphosphine oxides are readily formed by simple oxidation of the phosphines or by thermal decomposition of the tetraphosphonium bases, and are therefore to be preferred. Where the R radicles are organic, they may, for example, be methyl, ethyl, phenyl, p-tolyl, benzyl, etc.

The reaction between the olefine and the organic acid may be carried out at temperatures of the order of 200°–800° C. and especially at temperatures between about 300° or 350° and 650° C.

The reaction is also assisted by the use of pressures higher than atmospheric. Thus pressures of 5, 10, 20, 50 or 100 or more atmospheres may be employed with advantage, although atmospheric pressure may be employed if desired.

In the preferred form of the invention both the olefine and the acid are in the vapor state when they react and the catalysts are also preferably in the vapor state although solid or molten catalysts can be used, especially in conjunction with vapor phase catalysts. For example, the olefine and acid vapors together with a small amount of the vaporous catalyst may be passed through a heated tube which may, or may not, contain a solid or molten catalyst. If desired, the tube may be provided with some means for producing turbulence of the vapors and thus aiding the rapid attainment of the desired temperature. Such means may, for example, comprise baffles placed at intervals along the tube and arranged to cause the vapors to follow a zigzag route through the tube. For example, alternate baffles may leave a passage on opposite sides of the tube only or all the baffles may extend right across the tube, alternate baffles being perforated near the edges of the tube and at the centre of the tube respectively. Such baffles may, with advantage, be made of a material of high conductivity, for example copper. When a molten catalyst is employed the reactant vapors may be caused to bubble through it.

The amount of the catalyst vapor required is relatively small, for example usually less than 10% based on the weight of the acid. Thus an amount between .01 and 5% of the weight of the acid and especially between .05 and 2% may be used with advantage. Owing to the relatively small proportion of the vaporous catalyst employed, it is not usually worth while attempting to recover it, and this results in a relatively simple process uncomplicated by the difficulties of recovering and regenerating the catalyst.

It is usually of advantage to preheat the acid and/or the olefine before they enter the reaction zone. For example, a mixture of the acid and olefine vapors may be produced, heated in the absence of catalysts to a temperature between 200° and 400° C. and then compressed before being passed to the reaction zone and into contact with the catalyst. However, to avoid the difficulty of compressing hot acid vapors, the liquid acid may be vaporised under the desired pressure, and the vapor continuously withdrawn from the vaporiser without substantially reducing its pressure or temperature; the hot acid vapor may then be mixed intimately with olefine vapor under the same temperature and pressure conditions, and the mixed vapors, if desired after further preheating, may be passed to the reaction zone. In order to prevent premature reaction it is advisable to bring the vapors into contact with the catalyst for the first time in or immediately before the reaction zone. Advantageously therefore vaporous catalysts are introduced into the reactant vapor mixture only after the completion of preheating; similarly, if solid or molten catalysts are used, the vapor mixture should not come into contact with them until after the completion of preheating.

Any suitable method of introducing the catalyst into the reactants may be adopted. For example, the catalyst may be in solution or suspension in the organic acid which is to be vaporised and mixed with the olefine. In some cases when a catalyst is not capable of dissolving in anhydrous acid the acid may be diluted to a degree such that the catalyst is capable of dissolving therein to the desired extent.

However, as already indicated, it is preferable to preheat the vapors of the acid and the olefine first and then to add the catalyst. This may be done by injecting into the preheated vapors a relatively small amount of a liquid containing the catalyst in solution or suspension. The liquid employed will depend, among other things, on the solubility of the catalyst. When it is soluble in a concentrated acid the catalyst may be dissolved in a small quantity of the same acid as is to be employed in the reaction. For example phosphates of organic bases containing two or more carbon atoms, e. g., pyridine phosphate, piperidine phosphate, and phosphates of the aromatic bases and of aliphatic bases containing at least two carbon atoms, may be dissolved in anhydrous acid, for example anhydrous acetic acid. In other cases, however, the catalyst may not be soluble in the anhydrous acid and in such cases water or aqueous acid may be employed as for example with methylamine phosphate and ammonium phosphate. Moreover, other liquids which do not exert a deleterious effect on the reaction may be employed as solvents for the catalysts. In a process of this kind such liquids may assist in the separation of the ester formed and the acid by forming an azeotropic mixture with one or the other.

In order to prevent decomposition of the ester formed it is preferable to cool the products rapidly on leaving the reaction zone, and the heat removed from the products may be used to preheat further quantities of acid and/or olefine. For example, the mixture of vapors leaving the reaction zone may, after the pressure thereon has been released, be cooled to a temperature at which the less volatile components of the mixture are condensed leaving the more volatile in the vapor phase. Thus the mixture of ethyl acetate and unchanged acetic acid formed by the reaction of ethylene and acetic acid may be subjected to fractional condensation so as to remove the acetic acid, which may be returned to the process, and to obtain the ethyl acetate in a relatively pure form. On the other hand all the products may be condensed and the ester separated by fractional distillation or any other way. A further purification of the product may be carried out in any suitable way according to the standard of purity which it is desired to obtain.

In another method of carrying out the invention the acid may be employed in the liquid phase, subject to the use of suitable temperature and pressure conditions. The olefine may then be bubbled through the acid, preferably in the form of fine bubbles. If desired water may also be present. It is advantageous to lead in a vaporous phosphorus-containing catalyst with the olefine, but the acid may contain in solution or suspension solid catalysts, whether or not a vaporous catalyst is also employed.

The following example illustrates without in any way limiting the invention.

*Example*

Acetic acid vapor under a pressure of about 30 atmospheres and at a temperature between 275° and 280° C., and ethylene at a similar temperature and under the same pressure, are intimately mixed, and the vapor mixture so produced is further heated to 320° C. It is then caused to pass in a rapid stream through a reaction tube provided with baffles or some other means of producing a high degree of turbulence and heated to 550° C. Near the point where the vapors enter the reaction tube, there is injected a continuous stream of concentrated acetic acid containing in solution about 5% of triethyl phosphate, at a rate such that the resulting mixture contains about 0.3% of triethyl phosphate. The vapors leaving the reaction tube are rapidly cooled so as to condense the ethyl acetate formed and any unchanged acetic acid, and the condensate removed from the system and brought to atmospheric pressure. Uncondensed vapors and gases may be removed by means of a valve operating at the reaction pressure. From the condensate ethyl acetate may be recovered in the desired state of purity by fractionation or any other suitable process.

Having described my invention what I desire to secure by Letters Patent is:

1. In the manufacture of an ester by reaction between an olefine and a lower fatty acid, the step of carrying out said reaction in the presence of a compound of phosphorus dispersed in the gas phase.

2. In the manufacture of an ethyl ester by reaction between ethylene and a lower fatty acid, the step of carrying out said reaction in the presence of a compound of phosphorus dispersed in the gas phase.

3. In the manufacture of ethyl acetate by reaction between ethylene and acetic acid, the step of carrying out said reaction in the presence of a compound of phosphorus dispersed in the gas phase.

4. In the manufacture of an ester by reaction between an olefine and a lower fatty acid, the steps of passing a vaporous mixture of the olefine and acid into and through a heated reaction zone and injecting into said mixture a phosphorus compound contained in a liquid medium so as to form a gaseous dispersion of a phosphorus compound in the reaction zone.

5. In the manufacture of ethyl acetate by reaction between ethylene and acetic acid, the steps of passing a mixture of the ethylene and vaporous acetic acid into and through a heated reaction zone and injecting into said mixture a phosphorus compound contained in a liquid medium so as to form a gaseous dispersion of a phosphorus compound in the reaction zone.

6. In the manufacture of ethyl acetate by reaction between ethylene and acetic acid, the steps of passing a mixture of the ethylene and vaporous acetic acid into and through a heated reaction zone and injecting into said mixture a phosphorus compound selected from the group consisting of phosphoric acid, ammonium phosphate, phosphates of alkylamines and other organic bases, alkyl and other esters of phosphoric acid, amides of phosphoric acid, amides of phosphorous acid, phosphine, substituted phosphines, tetra-phosphonium bases and salts thereof and triphosphine oxides, said phosphorus compound being contained in a liquid medium, so as to form a gaseous dispersion of a phosphorus compound in the reaction zone.

7. The manufacture of an ester by reaction between a normally gaseous olefine and a lower fatty acid, comprising preheating a mixture of the olefine and the vapor of the acid to a temperature between 200 and 400° C., injecting into the preheated mixture a phosphorus compound contained in an aqueous medium, and passing the mixture produced rapidly through a reaction zone wherein they are heated to a temperature between that of the preheating and 650° C. so as to effect said reaction in the presence of a phosphorus compound dispersed in the gaseous phase.

8. The manufacture of ethyl acetate by reaction between ethylene and acetic acid, comprising preheating a mixture of ethylene and acetic acid vapor to a temperature between 200 and 400° C., injecting into the preheated mixture a phosphorus compound dispersed in an aqueous medium, and passing the mixture produced rapidly through a reaction zone wherein they are heated to a temperature between that of the preheating and 650° C. so as to effect said reaction in the presence of a phosphorus compound dispersed in the gaseous phase.

HENRY DREYFUS.